Oct. 11, 1932.          W. A. FROECKMAN          1,881,457
CIRCUIT AND POLARITY TESTER
Filed Jan. 27, 1930
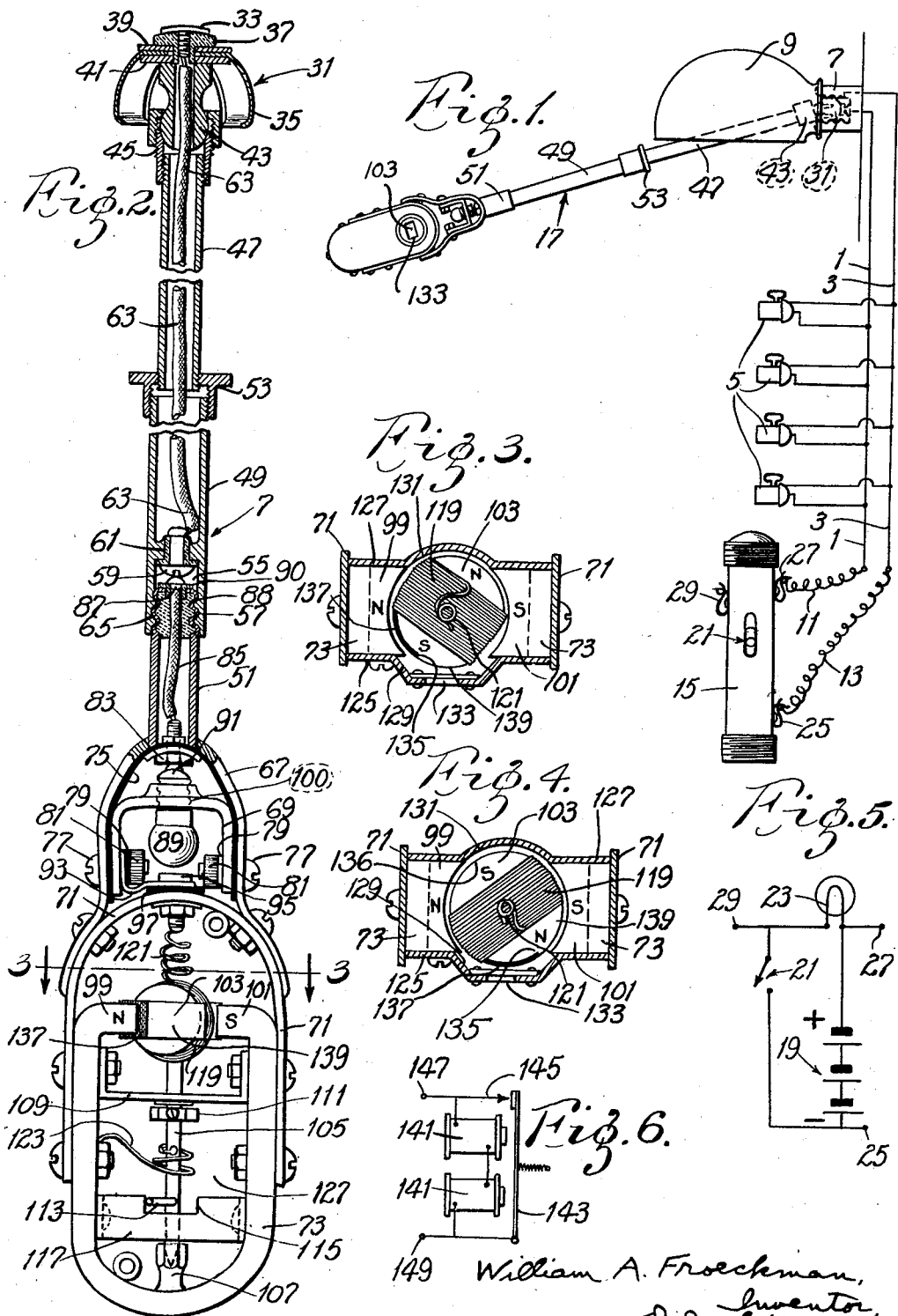
William A. Froeckman, Inventor
Delos G. Haynes, Attorney Patented Oct. 11, 1932

1,881,457

UNITED STATES PATENT OFFICE

WILLIAM A. FROECKMAN, OF ST. LOUIS, MISSOURI

CIRCUIT AND POLARITY TESTER

Application filed January 27, 1930. Serial No. 423,673.

This invention relates to circuit and polarity testers, and with regard to certain more specific features, to combined circuit and polarity testers for use in testing the lighting circuits of homes and/or buildings.

Among the several objects of the invention may be noted the provision of a tester which provides in combination means for testing for continuity of a circuit and means for testing the polarity of said circuit; the provision of a tester that is fool-proof in operation in that a false indication of polarity is prevented; the provision of certain features of construction which enable the tester to be used with different types of sockets and/or receptacles; the provision of certain features of construction which enable the tester to be applied to sockets and/or receptacles mounted in various positions and fitted with various types of shades and the like; and the provision of a tester that is simple, rugged, and inexpensive in construction, which may be readily carried in one's pocket, and which, among other things, is adapted to the needs of inspectors of house and/or building lighting systems. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawing, in which is illustrated one of various possible embodiments of the invention, Fig. 1 is a view showing a simplified branch of a lighting circuit and showing the tester in operation;

Fig. 2 is a side elevation of the tester with its covers removed and with certain portions shown in section;

Fig. 3 is a section taken on line 3—3 of Fig. 2 but with certain covers in place;

Fig. 4 is a section similar to Fig. 3 showing an alternate position of an armature;

Fig. 5 is a wiring diagram for the flash light shown in Fig. 1; and,

Fig. 6 is a wiring diagram for an electrical buzzer that may be substituted for a flash-light bulb used in the tester.

Similar reference characters indicate corresponding parts throughout the several views of the drawing.

Referring now more particularly to Fig. 1, there are illustrated at numerals 1, 3 two electrical leads supplying current to sockets 5 shunted thereacross. Leads 1, 3 also supply current to socket 7 which is represented as being fitted with a shade 9. At numerals 11, 13 there are represented the terminals of leads 1, 3 respectively. These are the terminals to which the power leads supplying the current for lighting or the like are connected.

Before connecting the power leads, however, it is desirable and, frequently required by law, that the wiring be inspected. One of the power leads is generally grounded and it is important that this particular lead be connected so that the shells or outer portions of the sockets be connected thereto. When testing a wiring system it is desirable therefore to see that all the shells or outer portions of the sockets are connected to the same common lead. For example, in the circuit shown in Fig. 1, the shells of the sockets 5 and 7 should be connected to lead 3. It is also desirable that the sockets be tested for continuity of circuit and for short-circuits. A thorough test therefore includes an individual test for every socket to determine if the socket is connected to the wiring system and if the outer portion or shell of the socket is connected to the proper lead, in addition to a test which will determine if there is a short circuit on the system.

It is desirable that these tests be made at low voltage and direct current should preferably be used, both of which features are available in the conventional flash light battery. In Fig. 1, a flash light 15 is shown connected to terminals 11, 13 and the tester 17 is shown applied to socket 7. By providing contacts on the casing of a flash light 15 it is not necessary to remove the cells from the casing.

Fig. 5 shows a wiring scheme for a conventional flash light where numeral 19 represents the cells, 21 the switch, 23 the bulb, and 25, 27, 29 represent terminals affixed to the casing. This particular method of supplying a testing current is shown by way of example only and the invention is not to be limited to this means.

The tests for short-circuit may first be made by connecting terminals 11, 13 to terminals 25, 29 on the flash light 15. With the switch or button 21 closed, the flash light lamp 23 will burn, provided the batteries 19 are in good condition. When, however, switch 21 is in the open position the bulb 23 should not light unless there is a short-circuit in the wiring system. If there happen to be lamps in the sockets, and the switches for these lamps are turned on, these will effectually close the circut through switch 21 and the lamp 23 will therefore have current flowing therethrough. The brilliancy of the lamp 23 will not, however, be as great as it would be if the circuit were short-circuited. Should lamp 23 light up when terminals 25, 29 are connected to terminals 11, 13 and switch 21 is opened, all that it is necessary to do to determine if a short-circuit exists or if the burning of lamp 23 is caused by a completed circuit effected by lamps in the sockets, is to close switch 21. If upon closing switch 21, the lamp 23 burns brighter, the burning of lamp 23 is not caused by a short-circuit in the wiring system. The resistances of the lamp filaments sufficiently reduce the current through lamp 23 so that the normal brilliance of lamp 23 is not obtained.

Terminals 25, 27 of the flash light 15 are used when the testing device 17 is employed. With the device 17 constructed as described hereinafter, terminal 25 should be connected to terminal 13 and terminal 27 to terminal 11.

Referring now to Fig. 2, a description of other features of construction of the combined circuit and polarity tester 17 will be given. Numeral 31 represents a contacting head adapted to be pushed into an ordinary electric light socket. Two contacting elements 33, 35 comprise the electrical parts of this head. The central contacting element 33 is insulated from the outer contacting element 35 by means of an insulating bushing 37. Contacting element 35 comprises a number of spring contacting members shaped as shown in Fig. 2 and clamped between metal washers 39, 41.

This contacting head 31 is flexibly mounted on the end of tube 47 by means of a ball and socket joint comprising a male member 43 and a female member 45. The provision of such a mounting enables the tester to be used in sockets provided with shades such as represented at numeral 9 in Fig. 1 without the necessity of removing said shades or similar interfering elements.

Lengths of metal tubes 47, 49, 51 provide means for coupling the contacting head 31 to the body of the tester and for increasing the effective length of the tester enabling it to be used in testing sockets that might otherwise not be reached unless the inspector or one using the tester climbed upon a stool or the like so that he might reach the socket. Lengths 47 and 49 are joined together by the screw coupling 53. Instead of using fixed lengths of tubing, it might prove advantageous to equip the tester with telescoping tubes so that an even greater effective length might be provided when desired. Also, instead of providing the ball and socket joint 43, 45, the desired flexibility could readily be obtained by using a short length of flexible tubing, a flexible joint, or spring or the like, any of which comprise a universal joint or connection.

The lower end of tube 49 forms a socket 55, the outer contacting portion 57 being an integral part of tube 49. The central contacting member 59 of socket 55 is insulated from the outer member 57 by means of a bushing 61. An insulated wire 63 connects the two central contacting members 33, 59 together.

Tube 51 is fitted with a screw plug 65 which screws into socket 55. Socket 55 and plug 65 are of what is known as a "candelabra" size. Screw plug 65 has a central contacting portion 87 insulated from an outer contacting portion 88 by an insulating bushing 90.

This plug and socket are provided so that candelabra socktes may be tested. Inasmuch as these sockets are considerably smaller than a regular socket (Edison screw socket) for which the head 31 is designed, it is desirable that some provision should be made for testing this smaller socket. With the plug and socket joint provided as shown it is necessary when testing candelabra sockets only to unscrew socket 55 from plug 65 and use the tester by screwing plug 65 into the socket to be tested. Inasmuch as candelabra sockets are generally within easy reach and are not generally fitted with shades, no provision is made for an increased effective length of the tester or for flexible coupling means for joining plug 65 to tube 51. Such provisions may, however, be made if considered desirable.

Tube 51 is rigidly affixed to a metal bracket piece 67 which serves also to support an inner bracket 69. Bracket 67 is bolted or otherwise affixed to another bracket 71, which is bolted to a permanent magnet 73. A strip of fibre or other insulating material 75 is placed between brackets 67 and 69, thereby insulating them from each other. The bolts 77 holding brackets 67 and 69 together pass through normal sized holes in bracket 67 and through over-sized holes in bracket 69. Insulating washers 79 are placed under nuts 81 screwed to bolts 77. Such a construction provides a complete insulation of bracket 67 from bracket 69.

A contact 83 is affixed in the lower end of tube 51 and is insulated from bracket 67. An insulated wire 85 connects contact 83 with the central contact 87 of screw plug 65.

A flash light bulb or signal device 89 screws into bracket 69 so that its central contact member 91 makes contact with contact 83. Bracket 69 is then in electrical contact with the outer or screw portion 100 of the bulb 89. This contact is continued by means of a lead 93 to a contact post 95 affixed to bracket 71 but insulated therefrom by insulation 97.

Magnet 73 has pole pieces (see Fig. 3) 99 and 101 shaped so as to permit rotation therebetween of a soft iron armature core 103. This core 103 is rotatably borne by a spindle 105 resting in a pivot bearing 107 affixed within the lower portion of the magnet 73. A guide bearing 109 holds armature core 103 in proper alignment between pole pieces 99, 101. A collar 111 fastened on spindle 105 holds said spindle in place thereby preventing armature core 103 from falling or being jarred out of place.

A perpendicular pin 113 is fitted to spindle 105 and moves within a notch 115 provided in a bridge member 117. The ends of this notch 115 effectively function as stops to restrict the movement of pin 113 and therefore the armature core 103 between the pole pieces 99, 101.

Core 103 is provided with a continuous armature winding 119, one lead of which is flexibly connected to contact 95 by a pigtail connection 121. The other end of this winding 119 is connected to spindle 105. A pigtail 123 connects the spindle 105 with magnet 73 thereby eliminating any dependence on frictional contact between spindle 105 and magnet 73. These pigtail connections 121, 123 are sufficiently flexible so as not to deter the free movement of core 103.

Cover plates 125, 127 are fitted on either side of the magnet 73 conforming at their upper ends to the shape of bracket 71 and at their lower ends to the shape of magnet 73 (see Figs. 1 and 3). Pockets 129, 131 are provided in covers 125, 127 respectively (Fig. 3) which permit of free movement of armature core 103 therebetween. A window 133 is provided in cover 125 through which the movement of armature core 103 may be observed.

One-half of face 135 of the armature core 103 is painted red as indicated by the heavy line 137, the other half 139 is painted white.

The electrical circuit for this testing device may be traced as follows:

Consider the central contact member 33 of the head 31 as the starting terminal. From terminal 33 the current flows through lead 63 to contact 59, from contact 59 to contact 87, from contact 87 through lead 85 to contact 83, from contact 83 to contact 91, from contact 91 through the filament of bulb 89 to bracket 69, from bracket 69 through lead 93 to contact 95, from contact 95 through pigtail lead 121, through armature winding 119 to spindle 105 and from spindle 105 through pigtail lead 123 to magnet 73. The return circuit is completed through magnet 73, bracket 71, bracket 67, tube 51, outer contacting portion 88 of screw plug 65, outer contacting portion 57 of socket 55, tube 49, tube 47, and then to the contacting members 35 forming the return terminal of the contacting head 31.

It is clear from the above tracing of the electrical circuit that the bulb 89 and armature winding 119 are in series. Any actuating current flowing through winding 119 must also flow through bulb 89 lighting same. Current flowing through winding 119 will set up magnetic lines of force between armature core 103 and pole pieces 99, 101 positioning said armature core in either the Fig. 3 or Fig. 4 position depending upon the polarity or direction of current flow through winding 119. After the armature has been positioned by a current flow through winding 119 it is clear that the armature will maintain this position after the current flow is stopped. For example, suppose the armature has been positioned as shown in Fig. 3 and the current flow stopped. It is clear that the magnetic lines of force from the pole faces 99, 101 will hold the armature core 103 in the position shown (face 135 near pole 99 and face 136 near pole 101) since such a position provides a path of least reluctance for the magnetic lines of force between poles 99, 101. If, however, a current of polarity opposite to that impressed in positioning the armature in the Fig. 3 position is impressed when the armature is in this position, the magnetic field set up by the current flow through winding 119 will be sufficiently strong to shift the armature to the Fig. 4 position in which position it will remain until a current of opposite polarity is applied.

Consider for purposes of further illustration, that winding 119 is wound in such a direction (clockwise when viewed from Fig. 2) that when the head 31 is pushed into a socket the shell of which is connected to the negative side of a wiring system and the central contact to the positive side (Fig. 1), the armature core will take the Fig. 3 position with bulb 89 lighted. Through window 133 the armature will appear white (see numeral 139) indicating the correct polarity for the particular socket being tested and the bulb 89 will indicate that the armature position is a result of a current flow and not of a previous test. If the connections to the socket were incorrectly made (shell connected to positive side and center connected to negative side) the armature would take the Fig. 4 position with bulb 89 lighted and red portion 137 of the armature appearing through window 133. Should the bulb 89 fail to light in any instance it would indicate that the socket being tested was not connected to the wiring system. Either position of the armature is meaningless without bulb 89 lighted. It is thus seen that the tests for continuity of circuit and for polarity are simultaneously made and that any false indication of polarity, due to no flow of current, is prevented.

Instead of using the signal bulb 89, it might be found desirable to employ a signal buzzer or other means of indicating a complete circuit. In Fig. 6 there is diagrammatically shown a preferred form of buzzer. Numeral 141 represents the coils, 143 the armature, 145 the stationary contact, and 147 and 149 the terminals of the buzzer. It will be noticed that the buzzer short-circuits itself, that is, when current flows through the coils 141 the armature 143 is pulled toward and contacts with contact 145 thereby short-circuiting coils 141. When coils 141 are short-circuited, there is no current flowing therethrough and the armature returns to its original position breaking the short-circuit. When the short-circuit is broken, the armature is again pulled toward contact 145 and the making and breaking of the short circuit continues so long as a voltage is applied to terminals 147, 149. It is thus seen that if the terminals 147, 149 of the buzzer were connected to contacting members 83, 95 of the tester instead of bulb 89, that the operation of the tester would be the same giving, however, an audible rather than a visual indication for continuity of circuit. With the buzzer constructed as shown, it is clear that an unbroken circuit through the buzzer is maintained.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. In an electric testing device, a contacting head for sockets to be tested, into which said head may be inserted, a flash light bulb, a permanent magnet, an iron armature core rotatable between the poles of said magnet, said armature having a winding thereon connected with said bulb and with said contacting head.

2. An electrical testing device comprising a contacting head, a bulb, a permanent magnet, an armature coil rotatable between the poles of said magnet, said bulb and said coil connected in series to said head, stops which limit the motion of said armature coil, and cover plates on said magnet having a window through which the position of the armature coil may be observed.

3. In a device for testing the wiring of house-lighting sockets, a contacting head, adapted to be inserted in said sockets, an extending length of tubing on which said head is mounted, a universal joint for mounting said head on said extending length, a bulb, a permanent magnet, an armature coil rotatable between the poles of said magnet, said bulb and said coil connected in series to said head.

4. In a device for testing the wiring of house-lighting sockets, a contacting head adapted to be inserted in said sockets, a signal, a polarity indicating means, said signal and said polarity indicating means being connected in series to said head, said polarity indicating means comprising a permanent magnet, an iron armature core rotatable between the poles of said magnet, an armature winding on said core, stops which limit the movement of said armature core so that a given face of said core may move only from one pole of the magnet to the other, said core moving to one position when a current of a given polarity flows through said armature winding and moving to the other position when the polarity of the current is reversed.

5. In a device for testing the wiring of house-lighting sockets, a contacting head adapted to be inserted in said sockets, an extending length on which said head is mounted, a universal joint for mounting said head on said extending length, a signal, and a polarity tester formed as a unit.

6. In an electric testing device, a contacting head for sockets to be tested into which said head may be inserted, a signal device, a magnet, a permeable armature core rotatable between the poles of said magnet, said armature having a winding thereon connected with said signal device and with said contacting head.

In testimony whereof, I have signed my name to this specification this 23rd day of January, 1930.

WILLIAM A. FROECKMAN.